Dec. 17, 1963  H. S. HEMSTREET  3,114,788
NAVIGATION TRAINING SYSTEM
Filed Aug. 24, 1955  3 Sheets-Sheet 1

HAROLD S. HEMSTREET
INVENTOR
BY *Richard L. Stephens*
ATTORNEY

HAROLD S. HEMSTREET
INVENTOR

BY *Richard L. Stephens*
ATTORNEY

HAROLD S. HEMSTREET
INVENTOR

United States Patent Office 3,114,788
Patented Dec. 17, 1963

3,114,788
NAVIGATION TRAINING SYSTEM
Harold S. Hemstreet, Binghamton, N.Y., assignor to General Precision, Inc., a corporation of Delaware
Filed Aug. 24, 1955, Ser. No. 530,378
6 Claims. (Cl. 35—10.2)

This invention relates to grounded navigation training equipment, and also to means for training persons to navigate using a new type of direction indicating equipment. Magnetic compasses and magnetic-slaved gyro compasses are well-known and widely used in the aeronautical arts, and various systems for simulating the operation of such compasses are well known in the prior art. A free magnetic compass, such as a flux gate compass utilizes the earth's magnetic field as a direction reference. Since the earth's magnetic field is distorted in many areas (particularly at high latitudes), such compasses are generally unsuitable for navigation through such areas. Because free magnetic compasses provide erratic and unreliable indications during turns, it has become very common to stabilize such compasses by means of directional gyros. Being responsive to high speed turning the directional gyro operates the indicator so as to provide steady and accurate indications during turns and other maneuvers, but since the steady-state direction reference is still derived from the earth's magnetic field, magnetically-slaved gyro compasses are also inaccurate in magnetically distorted areas. While the occasion for navigation through such areas has heretofore been somewhat rare, the advent of long-range and high speed aircraft has made polar navigation necessary for national defense as well as desirable for other reasons.

To provide a heading reference for navigation over the entire earth a new instrument has been devised by Kearfott Company, Inc. of Little Falls, New Jersey. Known as U.S. Air Force Type N–1, this new instrument is designed for use at all latitudes. It may be operated either as the equivalent of a latitude-corrected directional gyro or as a magnetic slaved compass. In either mode of operation the system provides an azimuth signal to position a visual indicator, and this signal also may be used for an automatic pilot or as a directional reference for radar and associated equipment. This application discloses in detail means for simulating operation of such a direction indicating instrument in conjunction with conventional grounded aircraft training equipment so that pilots and navigators may be trained to use such an instrument properly. While the invention is disclosed with relation to the N–1 compass, it will be apparent to those skilled in the art that many of the principles of the invention are useful as well in simulating operation of other direction indicating instruments. It will also be apparent that the invention is not limited to simulation of aircraft navigation systems but is applicable as well to marine navigation systems and navigation systems of vehicles in general.

Since free directional gyros tend to be stable in space rather than with respect to the earth, rotation of the earth causes an apparent precession of the gyro which depends in magnitude upon the latitude position of the gyro. Since it is desirable to provide simulated free directional gyro operation through widely varying latitudes, it becomes desirable to provide a navigation training system in which latitude precession of a directional gyro is properly simulated.

Another facet of long range navigation which must be considered in providing any realistic long range navigation trainer is the fact that the earth's meridians are not parallel, but converge at the earth's poles. Prior art trainers constructed for use in teaching navigation over much shorter distances have treated the meridians as being parallel. While the error involved in such shorter flights in non-polar areas often has been allowable, such errors may become very large in long range and polar navigation, and it is desirable to provide navigation training equipment which accurately takes into account the convergence of the earth's meridians, since flight paths and destinations are usually specified with relation to such.

Prior art flight trainers which incorporate the effects of simulated wind have usually provided systems wherein simulated wind direction was set in by the instructor with relation to a reference direction such as North. Such prior art systems are unsuitable for use in polar navigation training systems, however, and it has become desirable to provide a new "relative" wind system which eliminates several unrealistic phenomena occurring when such prior art devices are utilized to teach polar navigation.

It is therefore a primary object of the invention to provide an improved navigation training device.

It is a further object of the invention to provide a long-range and polar area navigation training device in which the convergence of the earth's meridians is properly simulated.

It is another object of the invention to provide a long-range polar area navigation training device in which apparent precession of a free directional gyro due to rotation of the earth is properly simulated.

It is a further object of the invention to provide a long range and polar area navigation training device having a novel simulated wind system.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
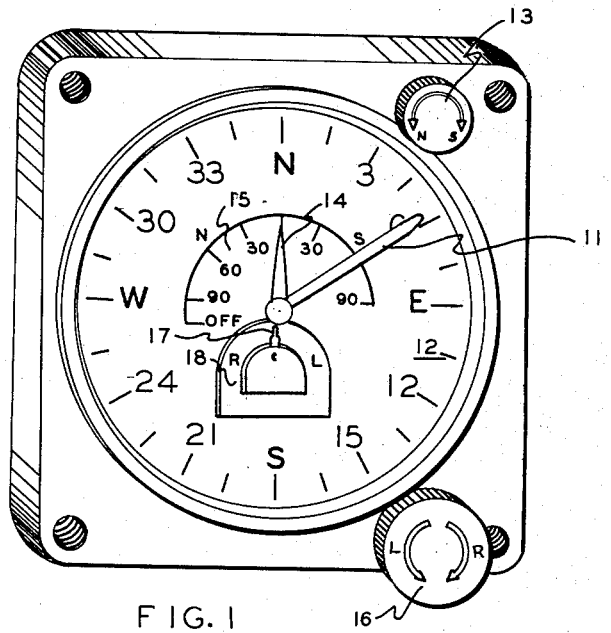
FIG. 1 is a front view of an exemplary simulated compass indicator instrument which may be used in conjunction with the invention.

Referring to FIG. 1 there is shown a front view of the master indicator of the N–1 compass system. Such an indicator is provided for observation by the navigator or pilot in an actual aircraft, and a similar appearing instrument may be mounted upon an instrument panel of a conventional grounded aircraft trainer. Heading pointer 11 may be read against dial 12 to provide heading information. When the actual system is operated as a directional gyro, the compass provides an accurate directional reference which is removed from the influence of the earth's magnetism and which functions in any locality. It is particularly useful where the earth's magnetic field is too weak or distorted for magnetic-slaved operation, and hence is used during flight at high latitudes. However, it is well-known that even the best available directional gyros do not hold a constant heading because of gyro wander or drift, usually due to bearing friction torques and minute gyro unbalances. Directional gyro readings are also made inaccurate because of an apparent drift due to the earth's rotation. Since a directional gyro is stable in space rather than with respect to the earth, rotation of the aircraft with the earth causes the directional gyro to "precess" with respect to the earth's meridian at a rate depending upon the latitude position of the aircraft on the earth. To correct for such "apparent drift" or latitude precession, the navigator of an actual aircraft is provided with a latitude correction control knob 13. Positioning of control knob 13 feeds a correction of 15 degrees per hour times the sine of latitude angle into the system. Rotation of control knob 13 by the navigator of the actual aircraft or by the navigator-trainee of the simulator is made manually with reference to latitude correction point 14, which moves with reference to latitude scale 15.

During magnetic-slaved operation the heading indicator is automatically compensated for the effects of gyro drift. Since the steady-state indication of the system during such operation is determined by a signal from a flux gate or other magnetic pickup, the heading point 11 is maintained at the correct magnetic heading. In order that the heading pointer 11 may be synchronized with the correct magnetic heading when the system is in magnetic-slaved operation, and in order that pointer 11 may be set to a desired gyro heading reference when the system is in directional gyro operation, synchronizer control 16 is provided. An annunciator pointer 17 indicates on dial face 18 whether synchronizer control 16 should be rotated to the left or to the right to synchronize.

Figure 2:
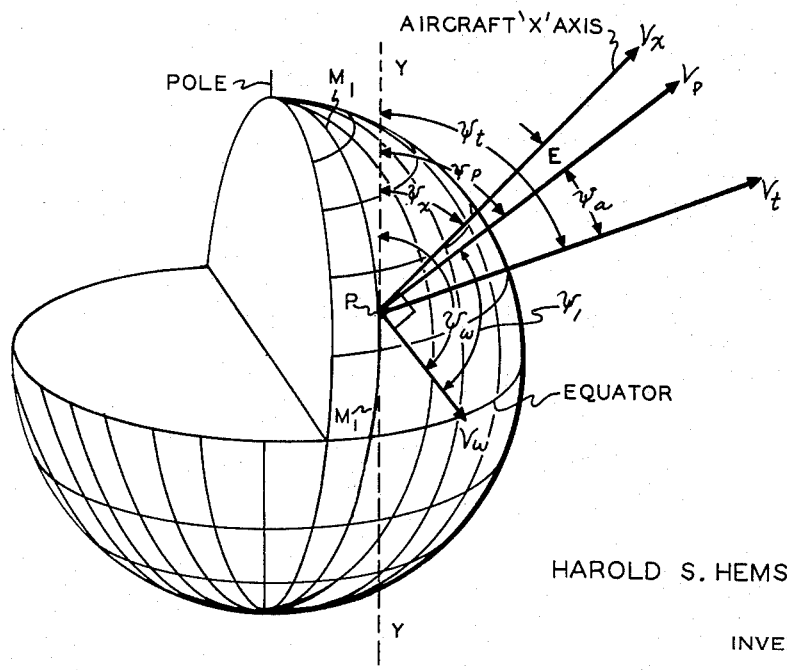
FIG. 2 is a geometrical diagram showing a point on the surface of a globe and indicating various angles and velocities which may be considered in understanding operation of the invention.

Shown in FIG. 2 is a portion of a globe with certain quantities necessary to consider for an understanding of the invention shown as angles and vectors. Assume that an aircraft or a ship is located on longitudinal meridian $M_1$ at point P on the surface of the earth. Since the size of the earth is very large compared to altitudes used, the altitude of an aircraft may be neglected and the aircraft may be considered earthbound with negligible error. Assume that the aircraft is headed in the direction of vector $V_x$ but has a horizontal component of sideslip angle $\epsilon$, so that its path with respect to a still air mass is along vector $V_p$. Now, if a wind having a velocity and direction indicated by vector $V_w$ is introduced, the aircraft will travel with respect to the earth along a ground track indicated by vector $V_t$. When the aircraft is located at point P its true heading is shown by the angle, $\psi_x$, the angle between the aircraft nose-tail axis and a tangent Y—Y to meridian $M_1$ at point P. Assume that the aircraft proceeded along path $V_t$ for a considerable distance, flying a perfectly straight (i.e. great circle) course. When the aircraft has made any appreciable change in latitude, its true heading will have changed even though the aircraft has not turned, unless, of course, the flight has been along a meridian. This change in heading with change in latitude may be seen to be caused by the fact that the earth's meridians are not parallel, but instead converge at the earth's true North and South poles. Since most prior art flight trainers and simulators do not provide means for simulating convergence of the earth's meridians, they have been suitably accurate only for teaching navigation through short distances. As mentioned above, the need for training long distance navigation and polar navigation is now acute, so that it is desirable to provide means which takes into account the curvature of the earth.

Since the magnetic poles are fixed on the earth the rotation of the earth has no effect on instrument indications derived from a flux-gate or magnetic-slaved gyro compass, with the exception of cases of navigation in outer space, with which this invention is not concerned. However, a free directional gyro is stable in space, so that rotation of the earth once in twenty-four hours causes the gyro reference to change direction with respect to the earth at a rate of 15 degrees per hour times the sine of the latitude angle at which the gyro is located. Hence it will be seen that such "apparent drift" or latitude precession of a directional gyro is an important quantity to be considered in long range navigation problems. Since directional gyro apparent precession increases with latitude angle and since directional gyros are useful principally at high latitudes where the earth's magnetic field is extremely distorted, it is very desirable that latitude precession of a gyro be properly simulated in a long range navigation trainer. And since long range navigation is very likely to involve the use of magnetic compass navigation as well as free directional gyro navigation, it is desirable to provide cooperative simulation of instruments used for both forms of navigation, so that navigation problems involving both modes of navigation may be practiced, and in order that the student may be trained to switch from one mode to the other at proper times.

Figure 3:
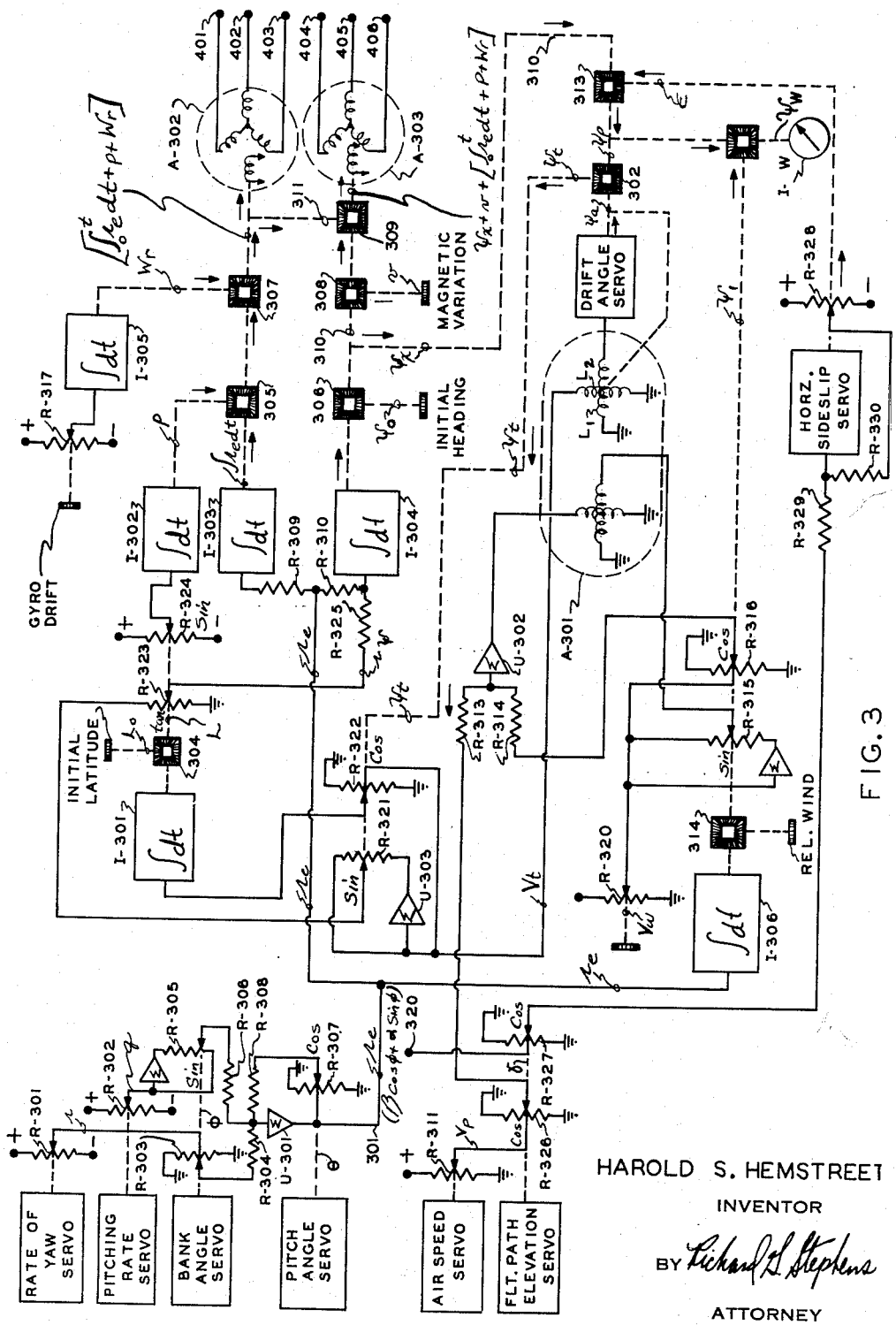
FIG. 3 is schematic diagram of a portion of an exemplary computer portion of the invention, with certain interconnections to conventional grounded aircraft trainer computer apparatus shown.

Shown in FIG. 3 in electrical schematic form is exemplary electrical apparatus suitable for computing operating potentials for the novel simulated instrument portion of the invention. The quantity $r_e$, which expresses the rotation of the rate of aircraft with respect to a vertical earth axis may be computed in conventional manner according to the following expression:

$$r_e = \frac{r \cos \phi + q \sin \phi}{\cos \theta}$$

where $r$ = aircraft rate of yaw about its own vertical axis
$q$ = aircraft pitching rate about its wing-to-wing axis
$\phi$ = aircraft angle of bank about its nose-tail axis
$\theta$ = aircraft pitch angle with respect to earth In FIG. 3 there are shown in block form a rate of yaw servo, a pitching rate servo, a bank angle servo and a pitch angle servo. These servos may comprise the conventional $r$, $q$, $\phi$ and $\theta$ servos utilized in most modern electronic flight trainers and simulators. Fixed amplitude alternating potentials from the computer power supply are applied to excite potentiometers R–301 and R–302, the arms of which are positioned in accordance with instantaneous simulated rate of yaw and pitching rate, respectively, by the trainer rate of yaw servo and pitching rate servo. The rate of yaw potential is applied to excite cosine resolver R–303, the arm of which is positioned in accordance with instantaneous simulated bank angle by the trainer bank angle servo, applying a potential proportional to $r \cos \phi$ to summing amplifier U–301 via summing resistance R–304. The pitching rate potential is applied to excite sine resolver R–305, the arm of which is also positioned by the trainer bank angle servo, applying ($q \sin \phi$) potential to summing amplifier U–301 via summing resistance R–306. The sum of these potentials, which is commensurate with the numerator of the above expression, appears at the output of amplifier U–301, and this potential is applied to excite cosine resolver R–307, the arm of which is positioned by the trainer pitch angle servo. The potential on the arm of resolver R–307 is applied to the input circuit of amplifier U–301 via scaling resistance R–308. It will be apparent to those skilled in the art that the connection serves to modify the output of amplifier U–301 so as to divide the two input potentials by the pitch angle potential, so that a potential proportional to $r_e$ is provided at the output of amplifier U–301. This potential is applied via conductor 301 to three integrating means for purposes to be described below.

The rate of rotation $r_e$ with respect to a vertical line, and the integration of that rate are the quantities commonly derived in prior art trainers to give simulated aircraft heading. If the simulated aircraft flies a long distance and the terms of the above expression do not change, simulated aircraft heading will not change in such prior art trainers, although the heading of an actual aircraft would change due to convergence of the earth's meridians. Hence prior art trainers may be said to operate on the basis of a "flat earth," while the invention takes into account meridian convergence. The rate $$r_\psi$$

at which aircraft heading changes due to convergence of meridians may be understood by reference to FIG. 2 to be expressable as follows:

$$r_\psi = V_t \sin \psi_t \tan L$$

where:

$V_t$ = aircraft ground speed
$\psi_t$ = aircraft ground track azimuth
$L$ = instantaneous latitude angle It may be understood that integration of the sum of the above-described rates of rotation $$(r_e \text{ and } r_\psi)$$

with respect to time, plus a constant of integration (initial heading $\psi_0$) will give the instantaneous heading of the aircraft in space, $\psi_x$. Potentials commensurate with such rates of rotation are applied via summing resistors R–310 and R–325 to integrator I–304, which provides a shaft output proportional to the time integral of the combined rates. Computation of the quantity $$r_\psi$$

will be explained below. Initial heading is added to such shaft output as by means of mechanical differential 306 to provide a position of shaft 310 which is a measure of simulated aircraft heading in space $\psi_x$. Simulated magnetic variation $v$ is added to $\psi_x$ by means of a manual input applied by the instructor to differential 308, so that a shaft input proportional to $\psi_x + v$ is applied as one input to mechanical differential 309. Those skilled in the art will recognize that instead of combining the $r_e$ and $$r_\psi$$

potentials and integrating the sum, that one may provide separate integrators for each quantity and combine the outputs of such integrators, as by means of a differential or other summing device.

The $\psi_x$ quantity represented by the position of shaft 310 is combined with the shaft output $\epsilon$ of a "horizontal component of slideslip angle servo" in differential 313 to provide a shaft position $\psi_p$ representative of the aircraft velocity direction with respect to a still air mass (direction of vector $V_p$ in FIG. 2). The horizontal component of slideslip angle may be computed in conventional manner. In FIG. 3, a potential commensurate with ($\beta \cos \phi + \alpha \sin \phi$) is applied at terminal 320 to excite cosine resolver R–327, the arm of which is positioned by a conventional grounded trainer flight path elevation angle or "$\gamma$" servo. The ($\beta \cos \phi + \alpha \sin \phi$) cos $\gamma$ potential on the arm of resolver R–327 is applied via summing resistor R–329 to position the "horizontal component of slideslip" servo. A followup potentiometer R–328 on the shaft of this servo provides rebalancing voltage in conventional manner. The potential at terminal 320 may be derived by applying slideslip angle $\beta$ and angle of attack $\alpha$ potentials from conventional grounded trainer slideslip angle and angle of attack computers (not shown) to sine and cosine resolvers (not shown) on the shaft of the trainer bank angle, or $\phi$ servo. Since an aircraft does not normally fly appreciable distances with a sideslip angle, the $\epsilon$ input may be omitted in some embodiments of the invention with negligible error.

The $\psi_p$ shaft position quantity is combined with a drift angle quantity $\psi_a$ in differential 302 to provide a shaft output $\psi_t$ which is a measure of the azimuth of the ground track of the simulated aircraft. The simulated drift angle $\psi_a$ is computed by taking into account vectorially the combined effects of aircraft velocity $V_p$ with respect to the air mass, and wind velocity $V_w$. The instructor may position the arm of potentiometer R–321 to derive a potential proportional to simulated wind velocity $V_w$, which is applied to excite sine and cosine resolvers R–315 and R–316. The arms of resolvers R–315 and R–316 are positioned in accordance with relative wind direction $\psi_1$ by means of integrator I–306 and a wind direction manual input to mechanical differential 314. The instructor may rotate the wind control knob while observing indicator I–W to set in a simulated wind at any desired angle with respect to the meridians. As the simulated flight progresses the wind direction relative to the aircraft path will then remain the same unless the wind control knob is moved by the instructor, or unless the aircraft turns, since integrator I–306 is responsive to any simulated aircraft turning. Thus if simulated flight occurs near polar regions the proper effect of simulated wind on the aircraft will be provided automatically at all times. In prior art trainers where simulated wind has been provided with reference to North, simulated flight near or at a polar region resulted in such an unrealistic condition as an extremely rapidly shifting wind. Those skilled in the art will recognize that integrators I–303 and I–306 are each shown as providing the same function and may comprise a single integrator, if desired. And as mentioned above, if the $r_e$ and $$r_\psi$$

potentials are integrated separately and the integrals combined, only two integrators need be provided to provide the output quantities shown as derived by integrators I–303, I–304, and I–306.

In computing the simulated drife angle $\psi_a$, a potential proportional to the horizontal component of airspeed and a potential proportional to the component of wind velocity along the airspeed vector are added in summing amplifier U–302 and applied to one primary winding of conventional induction resolver A–301. The horizontal component of airspeed potential is provided by modifying the airspeed potential from potentiometer R–311 in accordance with flight path elevation angle by means of cosine resolver R–326, and the wind component is derived by applying the wind velocity $V_w$ potential from potentiometer R–320 to cosine resolver R–316. The component of wind velocity normal to aircraft travel is derived by sine resolver R–315 and applied to the second primary winding of resolver A–301. The resultant field provided by the primary windings of the resolver has a magnitude and angular orientation representative of the combined aircraft and wind velocities. The resultant field thereby induces voltages in secondary or rotor coils $L_1$ and $L_2$ of resolver A–301. The voltage induced in coil $L_1$ is applied to the input of a drift angle servo, which rotates coils $L_1$ and $L_2$ until the voltage induced in coil $L_2$ is a minimum, at which time the angular position of the drift angle servo output shaft will be representative of simulated drift angle. Since rotor coil $L_2$ is arranged perpendicularly to coil $L_1$, the voltage in coil $L_2$ will then be a maximum, and will be proportional to aircraft ground speed. This ground speed potential is applied to excite sine resolver R–321 and cosine resolver R–322, the arms of which are positioned in accordance with ground track azimuth $\psi_t$ by the output shaft of differential 302.

The potential on the arm of resolver R–322, which represents velocity in a North-South or meridian direction is integrated by integrator I–301 to provide a shaft output proportional to latitude. Initial latitude $L_0$ is added to the output of integrator I–301 by means of a manual input to differential 304, so that the arms of potentiometers R–323 and R–324 are positioned in accordance with instantaneous simulated latitude. The ground velocity component in an East-West direction is represented by the potential on the arm of sine resolver R–321. This potential is applied to tangent potentiometer R–323 to provide a ($V_t \sin \psi_t \tan L$) or $$r_\psi$$

potential which as mentioned above, is proportional to the rate of change of heading of the aircraft due to convergence of the meridians, and which is applied via R–325 to integrator I–304. The potentials from resolvers R–321 and R–322 representing East-West and North-South travel may also be applied to operate a conventional ground track recorder (not shown) having integrating servos connected to move a recording pen in two perpendicular directions, and longitude counter registers may also be driven by such servos to furnish to the instructor instantaneous simulated longitude and latitude indications.

Sine potentiometer R–324 is excited by constant potentials and its arm is positioned by the latitude shaft so that a potential proportional to sin L is applied to integrator I–302. The output of integrator I–302 represents latitude precession or apparent drift $p$, and is scaled so as to provide a compass change of 15 degrees per hour times the sine of the latitude angle. The potential commensurate with rate of rotation of the aircraft with respect to an earth vertical or $r_e$ is integrated with respect to time by integrator I–303 and the integrator output combined with the latitude precession quantity by means of differential 305. The $\int r_e dt + p$ output from differential 305 is combined with a simulated "random wander" quantity applied to differential 307 from integrator I–305. The random wander $W_r$ quantity is obtained by integrating a "random wander" or "gyro mechanical drift" rate selected by the instructor by positioning the arm of potentiometer R–317. The output from differential 307 is applied to position the rotor of synchro A–302 and also applied as an input to differential 309. The rotor of synchro A–302 induces voltages in the stator windings of synchro A–302 which are representative of the angular quantity $(\int r_e dt + p + W_r)$, and these velocities are applied via terminals 401, 402, and 403 to apparatus to be shown and explained in connection with FIG. 4.

Figure 4:
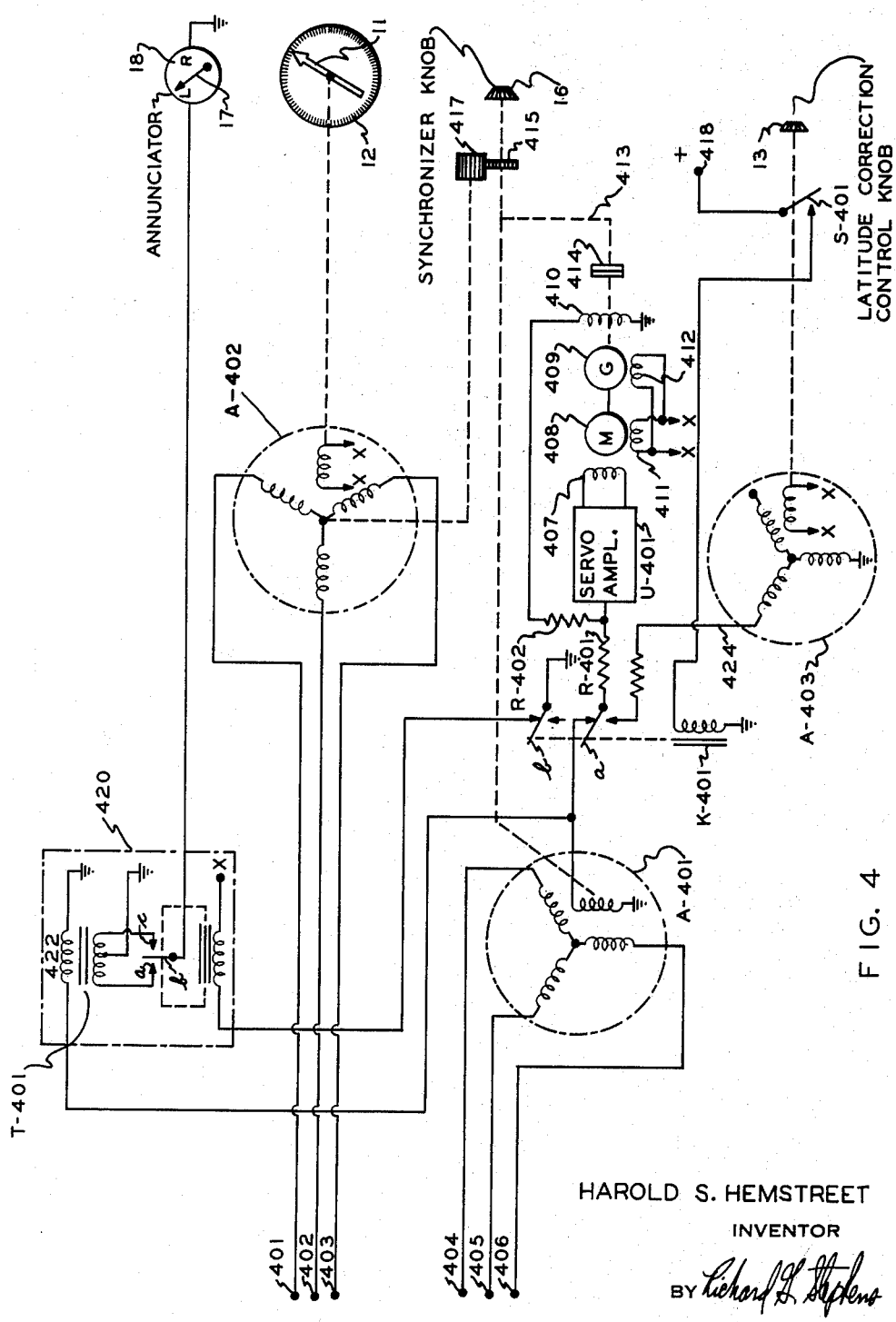
FIG. 4 is a schematic diagram of another portion of the exemplary computer portion of the invention and an exemplary simulated instrument portion of the invention.

The heading plus magnetic variation or $(\psi_x + v)$ output from differential 308 is added in differential 309 to the $(\int r_e dt + p + w_r)$ quantity from shaft 311, so that the rotor coil of synchro A–303 is positioned in accordance with the angular quantity $(\psi_x + v + \int r_e dt + p + w_r)$, deriving potentials commensurate with such quantity for application to the apparatus of FIG. 4 via terminals 404, 405 and 406.

FIG. 4 shows in electrical schematic form an exemplary embodiment of the instrument portion of the invention. Input potentials corresponding to the quantity $(\int r_e dt + p + w_r)$ derived as explained in connection with FIG. 3 are connected to terminals 401, 402 and 403, and input potentials commensurate with the angular quantity $(\psi_x + v + \int r_e dt + p + w_r)$ may be connected to terminals 404, 405 and 406. Assume that the student choses the magnetic slaved gyro mode of operation by turning latitude correction control knob 13 to its counterclockwise limit. Switch S–401, the arm of which is actuated by the latitude correction control knob 13, will be open, so that relay K–401 will remain de-energized, and contacts $a$ and $b$ of relay K–401 will be in the positions shown in FIG. 4. The input potentials on terminals 404, 405 and 406 are applied to the three stator windings of synchro A–401, providing a resultant magnetic field which induces a voltage in the rotor coil of synchro A–401. The induced voltage is applied through contact $a$ of relay K–401 and summing resistor R–401 to the input of servo amplifier U–401. The amplified output of amplifier U–401 drives winding 407 of a conventional induction servo motor 408. Servo motor 408 drives the drag cup 409 of a conventional tachometer generator, inducing a voltage in winding 410 of the generator proportional to the speed of rotation of the servo motor 408. Quadrature excitations for the motor and generator are furnished by windings 411 and 412, respectively. The output shaft 413 of servo motor 408 is mechanically connected to the rotor of synchro A–401, so that rotation of servo motor 408 will reduce the voltage applied to motor 408. Hence servo motor 408 will drive the rotor of synchro A–401 to a null or balanced position, so that the position of output shaft 413 will be a measure of the input quantity applied to terminals 404, 405 and 406 of synchro A–401. The voltage output of tachometer generator winding 410 is fed back via scaling resistance R–402 to the input circuit of servo amplifier U–401, serving to stabilize the operation of the servo by minimizing overshoot and hunting. The output shaft 413 is also mechanically connected through a slip clutch 414 and gearing (415, 416, 417) to the stator of synchro A–402. The potentials applied to terminals 401, 402 and 403 produce a resultant field in synchro A–402 having a direction corresponding to the input quantity $(\int r_e dt + p + w_r)$. Rotation of the stator of synchro A–402 by servo motor 408 through the angle $(\psi_x + v + r_e + p + w_r)$ serves to subtract the two angular quantities, thereby providing a resultant field having a direction corresponding the angle $(\psi_x + v)$, which expresses the magnetic heading of the aircraft. The rotor of synchro A–402 follows this resultant field and turns main pointer 11 with respect to dial 12, thereby providing an indication of magnetic heading. Contact $b$ of relay K–401 grounds one terminal of coil 421, the other terminal of which is connected to the alternating current source. Coil 421 comprises the vibrator coil of a synchronous rectifier indicated generally as 420 within dashed lines of FIG. 4. The alternating voltage output from the rotor coil of synchro A–401 is applied to the primary winding 422 of a transformer T–401. The center-tapped secondary of transformer T–401 supplies a proportional alternating voltage to contacts $a$ and $c$. Vibrating contact $b$, which is switched at the alternating frequency between contacts $a$ and $c$ thereby derives a direct potential which is roughly proportional to the quantity $$(\psi_x + v + r_e + p + w_r)$$

This rectified potential is applied to operate the annunicator pointer. The annunicator may comprise a conventional D'Arsonval movement having a zero center. While I have shown a synchronous rectifier means, it will be apparent to those skilled in the art that this mechanical rectifier may be replaced by a selenium, copper oxide or other electronic rectifier, and contact $b$ of relay K–401 may be used to connect the rotor output voltage to such rectifier.

The annunciator may be seen to be energized by a voltage which is commensurate in amplitude and polarity with the error signal applied during magnetic slaved operation to servo amplifier U–401, and hence the annunciator indication reveals the amount and direction in which servo-motor 408 should rotate to be balanced. If the synchronizer knob 16 is pulled outwardly (to the right as viewed in FIG. 4) so that gear 415 does not mesh with gear 417, the synchronizer may then be rotated, rotating shaft 413 and the rotor coil of synchro A–401 with respect to servo motor 408. The synchronizer control knob may be rotated by the student until the error voltage disappears, which will be indicated by the annunciator pointer being centered on its scale. By this means the main heading pointer may be set to the correct magnetic heading when magnetic slaved operation is used, and the main pointer may be set to the desired gyro heading reference when the directional gyro mode of operation is used.

Now assume that the student selects the free directional gyro mode of operation by turning latitude correction control knob 13 clockwise. Rotation of the control knob from its "Off" position closes switch S–401, which remains closed as the control knob is rotated further clockwise. Closure of switch S–401 applies a direct voltage from terminal 418 to energize relay K–401, moving its contacts $a$ and $b$ downwardly as viewed in FIG. 4. Opening of contact $b$ of relay K–401 disables rectifier means 420, so that no indication appears on the annunciator. The switching of contact $a$ of relay K–401 disconnects the rotor of synchro A–401 from the servo amplifier U–401, and substitutes a latitude correction control voltage from synchro A–403. By rotating latitude correction control knob 13 the student rotates the rotor of synchro A–403 with respect to its stator, deriving a voltage on conductor 424 which varies in amplitude sinusoidally with rotation of latitude correction control knob 13. While navigating in simulated equatorial regions the latitude correction control knob 13 should be set by the student at or near zero on the latitude correction scale 15. No voltage will be applied from synchro A–403 to the servo amplifier. For flying at or near polar areas, latitude correction knob 13 should be set by the student to a high latitude value on scale 15. The voltage thereby derived by synchro A–403 may be of a magnitude sufficient to operate servo motor 408 so that the main heading pointer 11 will rotate at 15 degrees per hour times the sine of the latitude selected by the student on latitude correction scale 15. If the student has properly adjusted the latitude correction control in accordance with the instantaneous latitude of simulated flight, the rotation of the stator of synchro A–402 by servo 408 will cancel out the latitude precession angle $p$ supplied to synchro A–402, so that the rotor of synchro A–402 will position the main pointer 11 at headings in accordance with the quantity $(\int r_e dt + w_r)$. Then, if the simulated aircraft is "flown" in a straight line over the earth, the only rotation of main pointer 11 will be the result of simulated gyro random wander or drift as selected by the instructor's setting of random wander control potentiometer R–317. Any error in the adjustment made by the student of the latitude correction control will provide an erroneous compass indication of the same magnitude as that occurring during actual flight.

Although I have shown specific computing elements in FIGS. 3 and 4, those skilled in the art will be able to substitute a wide range of equivalents without departing from the invention. Direct current computation may be substituted for the alternating current system shown. Those skilled in the art will recognize that many of the arithmetic operations of the computer may be performed with alternative devices. For example, the many mechanical additions and subtractions shown in FIGS. 3 and 4 as being made by means of mechanical differentials may be made by use of electrical summing means, such as differential synchros, summing amplifiers, etc.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative, and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Grounded navigation training apparatus comprising means for deriving a first quantity which is solely a function of the rate of turn of a simulated vehicle with respect to earth about a vertical axis, means for deriving a second quantity commensurate with the apparent rate of turn of said simulated vehicle with respect to the longitudinal meridian of its instantaneous position, means responsive to said first and second quantities for adding said quantities to provide a third quantity, and integrating means responsive to said third quantity for integrating said third quantity with respect to time to provide an output quantity commensurate with instantaneous simulated heading of said vehicle with respect to said longitudinal meridian.

2. Grounded navigation training apparatus comprising means for deriving a first quantity which is solely a function of the rate of turn of a simulated vehicle with respect to earth about a vertical axis, means for deriving a first potential commensurate with speed of said vehicle with respect to the earth, means for modifying said first potential in accordance with track azimuth of said vehicle to provide a second potential, means for modifying said second potential in accordance with instantaneous simulated latitude of said vehicle to provide a third potential, means responsive to said first quantity and said third potential for adding said first quantity and said third potential to provide a second quantity, and integrating means responsive to said second quantity for integrating said second quantity with respect to time to provide an output quantity commensurate with simulated heading of said vehicle.

3. Grounded navigation training apparatus comprising in combination means for deriving a first quantity commensurate with turning of a simulated aircraft about a vertical axis, means controllable by an instructor for adding to said first quantity a second quantity commensurate with the desired angle of a simulated wind to provide a relative wind angle quantity, means controllable by an instructor for deriving a first potential commensurate with a desired simulated wind velocity, means for resolving said first potential in accordance with said relative wind angle quantity into component potentials commensurate with wind velocity components in two perpendicular directions, means for deriving a second potential commensurate with simulated airspeed, a resolver having a pair of primary windings and a pair of secondary windings, circuit means applying said second potential and one of said component potentials to one primary winding of said resolver and applying the other of said components potentials at all times to the exclusion of any potential commensurate with said simulated airspeed to the other primary winding of said resolver, and servo means connected to one secondary coil of said resolver and operative to rotate said secondary windings with respect to said primary windings to a null position, whereby the position of said servo means provides a quantity representative of simulated drift angle and a potential proportional to ground speed is induced in the other secondary coil.

4. Grounded navigation training apparatus comprising means for deriving a first quantity which is solely a function of rate of turn of a simulated aircraft with respect to earth about a vertical axis, means responsive to simulated instantaneous latitude for deriving a second quantity commensurate with apparent drift of a simulated free directional gyro, means controllable by a student for deriving a third quantity proportional to a selected gyro latitude correction, integrating means responsive to each of said first, second and third quantities for integrating said quantities with respect to time to provide integrated quantities, and indicator means responsive to said integrated quantities to provide a simulated free directional gyrocompass indication for observation by said student.

5. Grounded navigation training apparatus comprising in combination, a simulated compass observable by a student and operable to provide simulated magnetic-slaved and free directional gyro compass indications, means for deriving a first quantity commensurate with turning of a simulated vehicle about a vertical axis, means responsive to simulated latitude of said vehicle for deriving a second quantity commensurate with apparent drift of a free directional gyro due to rotation of the earth, means combining said first and second quantities to provide a first output quantity, means responsive to simulated ground track, ground speed and latitude for providing a third quantity commensurate with change of heading of said vehicle due to convergence of the earth's meridians, means controllable by an instructor for providing a simulated magnetic variation quantity, means combining said first quantity, said third quantity, said magnetic variation quantity and said first output quantity to provide a second output quantity, switch means operable by said student to connect one or both of said output quantities to operate said simulated compass, and means operable by said student for deriving a selected latitude correction control quantity.

6. Grounded navigation training apparatus comprising in combination means for deriving a first quantity commensurate with turning of a simulated aircraft about a vertical axis, means controllable by an instructor for adding to said first quantity a second quantity commensurate with the desired angle of a simulated wind to provide a relative wind angle quantity, means controllable by an instructor for deriving a first potential commensurate with a desired simulated wind velocity, means for resolving said first potential in accordance with said relative wind angle quantity into component potentials commensurate with wind velocity components in two perpendicular directions, means for deriving a second potential commensurate with simulated airspeed, a resolver having a pair of primary windings and a pair of secondary windings, circuit means applying said second potential and one of said component potentials to one primary winding of said resolver and the other of said component potentials to the other primary winding of said resolver, servo means connected to one secondary coil of said resolver and operative to rotate said secondary windings with respect to said primary windings to a null position, whereby the position of said servo means provides a quantity representative of simulated drift angle and a potential proportional to ground speed is induced in the other secondary coil, means responsive to said first quantity for providing an airspeed direction quantity, means subtracting said quantity representative of simulated drift angle from said airspeed direction quantity to provide an output quantity, and an indicator responsive to said output quantity to indicate the direction of said desired simulated wind angle.

References Cited in the file of this patent

UNITED STATES PATENTS

| | | |
|---|---|---|
| 2,475,314 | Dehmel | July 5, 1949 |
| 2,485,301 | Lowkrantz et al. | Oct. 18, 1949 |
| 2,506,998 | Dehmel | May 9, 1950 |
| 2,519,180 | Ergen | Aug. 15, 1950 |
| 2,528,502 | De Florez et al. | Nov. 7, 1950 |
| 2,560,528 | Dehmel | July 10, 1951 |

OTHER REFERENCES

| | | |
|---|---|---|
| 1,101,623 | France | Apr. 27, 1955 |